United States Patent [19]
Laute

[11] 3,801,053
[45] Apr. 2, 1974

[54] CHRISTMAS TREE STAND OR THE LIKE

[76] Inventor: Wilmar Laute, Max Loebner Strasse 36, 53 Bonn-Bad Godesberg, Germany

[22] Filed: Jan. 29, 1973

[21] Appl. No.: 329,042

Related U.S. Application Data

[62] Division of Ser. No. 188,225, Oct. 12, 1971.

[30] Foreign Application Priority Data
Feb. 5, 1973 Germany.............................. 2106221

[52] U.S. Cl. ................................................ 248/44
[51] Int. Cl............................................. A47g 33/12
[58] Field of Search.......... 248/44, 46, 47, 48, 316 B

[56] References Cited
UNITED STATES PATENTS
| | | | |
|---|---|---|---|
| 378,901 | 3/1888 | Parcelle............................ | 248/316 B |
| 1,397,254 | 11/1921 | Karschitz............................. | 248/44 |
| 2,446,949 | 8/1948 | Neutra................................. | 248/44 |
| 2,455,025 | 11/1948 | Schroeder........................... | 248/47 |
| 2,484,186 | 10/1949 | Rorvik................................. | 248/44 |
| 2,761,641 | 9/1956 | Lubbers............................... | 248/44 |
| 2,896,293 | 7/1959 | Love.................................... | 248/44 |
| 3,270,994 | 9/1966 | Machan et al. .................. | 248/316 B |
| 3,347,503 | 10/1967 | Kortan................................. | 248/46 |
| 3,473,771 | 10/1969 | Newman............................. | 248/188.6 |
| 3,526,379 | 9/1970 | Schwaderlapp...................... | 248/44 |

Primary Examiner—Marion Parsons, Jr.

[57] ABSTRACT

A gripping stand comprising a plurality of upwardly directed, substantially equally spaced arms which pivot onto a tree trunk and are tightened by downwardly directed bolts, the arms and tightening bolts being attached to or engaging a water pan which holds water for the trunk and acts as a structural stabilizing component of the stand for the tree.

4 Claims, 4 Drawing Figures

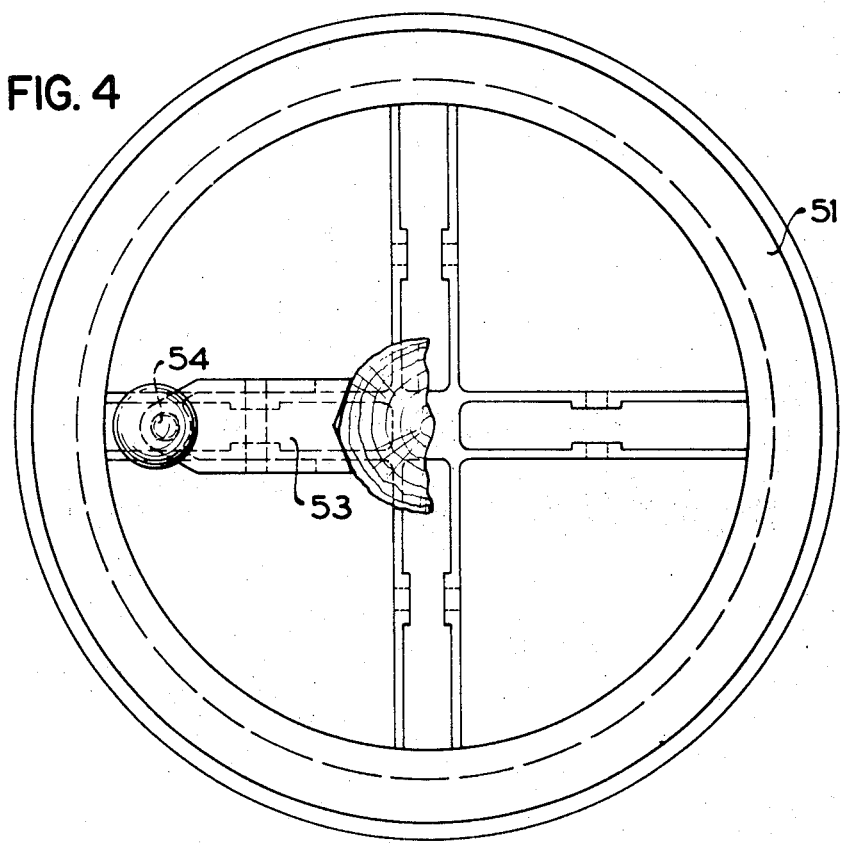

CHRISTMAS TREE STAND OR THE LIKE

This application is a division of my co-pending application Ser. No. 188,225 filed Oct. 12, 1971.

The invention relates to a stand device for Christmas trees or the like consisting of a water pan with a receiving device for the bottom end of the tree and several pivoting gripping arms with bolts for tightening and loosening the receiving device.

An object of the invention is to provide a stand with a water pan suitable for a wide trunk diameter range, which stand can be handled easily yet comfortably and is simple in design.

To this end, according to the present invention, the gripping stand comprises a plurality of upwardly directed, substantially equally spaced arms which can be pivoted onto the trunk by means of downwardly directed tightening bolts, and the arms and tightening bolts are attached to or engage the water pan directly or indirectly at their bottom ends. By virtue of these features, various advantages are obtained.

Firstly, the manually operated tightening bolts, being steeply pitched, can easily be worked from above, since access to them is not hindered by the edge of the water pan. The gripping arms can be spread widely to embrace and securely grip tree trunks from a very small to a relative large diameter without need of pointing the trunk. Therefore, the arms can embrace and securely grip tree trunks whose diameters range widely from very small to relatively large sizes.

Another advantage is that the tree gripped in the stand is easily set in an exactly upright position by tightening or loosening opposite bolts, so that the stability of the tree is increased.

In one embodiment of the invention, the gripping device, which comprises the arms, the tightening bolts and a central mounting element for the end of the trunk, for example a spike for vertical entry into the tree trunk, is in the form of an inserted stand base which can be clamped into the water pan. Preferably, the water pan has a turned-in edge and the stand base has resilient elements by means of which the stand base is securely held under tension between the turned-in edge and the bottom of the water pan. In a very convenient and inexpensive embodiment, the gripping arms are connected by means of joints to the stand base and spreader springs are provided to urge the arms open when the bolts are loosened.

A common difficulty in the erection of Christmas trees or the like is that, when first gripped, the tree is not always vertical but requires realignment and, to do this, one of the gripping arms must be loosened. The loosening and re-tightening of an arm for the purpose of realignment can be carried out easily and accurately if the motion of the top end of the arm is directed at right angles onto the surface of the tree trunk.

To achieve this object in accordance with the invention, the gripping arms are disposed substantially parallelly to the trunk and their bottom pivot bearings are near the downward extension of the outside surface of the trunk. If realignment of the tree is necessary after the trunk has first been gripped, the arm which must be loosened is easily lifted from the tree trunk, because the top end of the arm engages the trunk at right angles to the surface of the trunk and can not be caught in the rough bark. As a result, the arm can be loosened with great accuracy, and the opposite arm can be retensioned with equal accuracy, so that the trunk can be brought into an exactly vertical upright position by simply turning a couple of bolts in a few operations systematically carried out, without danger of toppling.

According to another and special feature of the invention, the arms have inwardly bent top and bottom ends, the top ends forming the trunk fixing portions of the arms and the bottom ends carrying the pivot bearings.

In accordance with the invention, the tightening bolts engage both the stand base and the bottom portions of the gripping arms. Each tightening bolt is mounted on the outside of the associated arm passing a projecting portion for tilting and as tilt limit of the said arm on the stand base. The tightening bolts are substantially vertical to the bottom of the pan and their gripping portion may be at any height above the stand base. This embodiment is particularly suitable for use with a water pan which receives the stand base. In this embodiment also, it is desirable and advantageous to make the water pan and stand base in one piece.

Lastly, according to a further feature of the invention, springs or positive mechanical guides associated with the gripping arms pivot the arms automatically outwardly when the tightening bolts are loosened.

The invention will now be described in more detail with reference to various embodiments illustrated in the drawings, in which:

FIG. 3 is a vertical section through another embodiment; and,

FIG. 4 is a plan view of the stand shown in FIG. 3.

Figure 1:
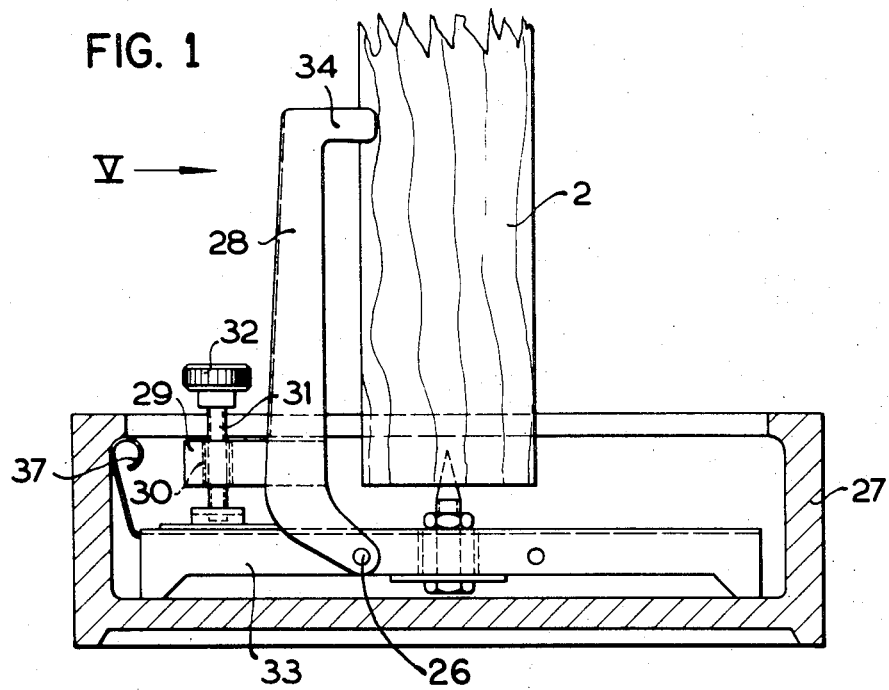
FIG. 1 is a side elevation of an embodiment of the stand.
Figure 2:
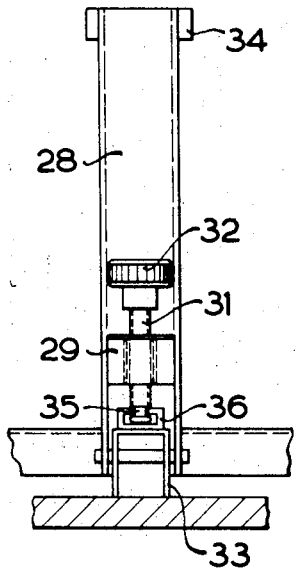
FIG. 2 shows a detail of the stand shown in FIG. 1, in the direction of the arrow V in FIG. 1.

FIGS. 1 and 2 show an embodiment wherein a stand base is inserted inside a water pan 27 and each of the gripping arms 28 has an outwardly direction projection 29 with a threaded bore 30 which receives a tightening bolt 31, which acts as a pressure screw and has a fixed grip 32. When the arms 28 are clamped tighter onto the tree trunk 2, the tightening bolt 31 supports itself on the stand base 33 and causes the upper trunk fixing portion 34 of the arm to pivot onto the trunk. Since the bolt 31 is substantially parallel to the arm 28, it tilts and its lower end shifts slightly laterally (in the plane of the drawing). To ensure that the arm 28 is pulled away from the trunk 2 when the tightening bolt 31 is loosened, a constriction 35 is provided at the bottom end of the bolt 31, and a guide member in the form of a C-section 36, whose free edges engage the constriction 35, if fixed to the stand base 33. When the tightening bolt 31 is loosened, the projection 29 is pushed downwardly by the bolt 31, which is stationary at the bottom, and the arms 28 are tilted outwardly, the bottom end of the bolt 31 shifting slightly to the right in the C-rail and the bolt taking up a slightly oblique position.

When the gripping stand is inserted into the water pan 27, leaf springs 37 fixed to the legs of the stand base 33 catch underneath the edge of the pan and hold the stand base in its position in the pan. It is preferable that the edge of the pan be undercut. The vertical pressure screw arrangement shown in FIGS. 1 and 2 is particularly suitable for use with a water pan in which the knobs or other grips are readily accessible. The stand may be made of any material, for example, wood, metal, synthetic plastic material or ceramic.

FIGS. 3 and 4 illustrate another embodiment similar to the embodiment shown in FIG. 2. However, in contrast to FIG. 2, the stand base or the base of the gripping device is formed in one piece with the water pan 51. The spike 52 and gripping arms 53 are fixed or pivoted directly on the water pan, whereas the tightening bolts 54 are supported on the bottom of the water pan.

The lifting of a gripping arm after loosening of the tightening bolt may be assisted by spring means, preferably a spiral spring 55 which is mounted on the axis of the bearing at the bottom of the pan.

Although each of the FIGS. illustrates an embodiment of gripping stand in which the central mounting element is in the form of a spike, the invention contemplates using other central mounting elements, such as, for example, a sleeve or funnel-like mount into which the tree trunk may be inserted.

All of the illustrated embodiments show four arms in cruciform configuration, but it is contemplated that three, five, six or more arms may be used in equally spaced apart relation without departing from the spirit of the invention.

What is claimed is:

1. A stand device for Christmas trees or the like comprising:
   in combination a water pan and an inserted stand base;
   said stand base comprising a plurality of pivoting gripping arms and associated tightening and lifting bolts distributed around the middle of the pan;
   said gripping arms having a longer portion and a rectangular shorter portion, said shorter portion being lifted upon tightening of said bolts, and said longer portion being pivoted to cause said gripping arms to engage the trunk of the Christmas tree;
   each tightening bolt being mounted outside and substantially parallel to the longer portion of the associated gripping arm;
   a receiving device for the bottom end of the trunk which is disposed in the middle of said water pan;
   bearing means associated with said stand base inside said water pan for mounting said gripping arms near the bottom end of said longer portion, whereby the longer portion of the gripping arms point upward vertically in relation to the bottom of the pan and a rectangular shorter portion points horizontally toward the edge of the pan and said tightening bolts are directed downwardly through threaded bore means for the bolts in the rectangular shorter portions of said gripping arms for engagement with said base near the bottom of the pan, connect said bolts downwardly and connecting said shorter portions by said threaded bore means to the base at the bottom end of the bolts.

2. A stand as claimed in claim 1, wherein said downwardly directed bolts are provided with a constriction at their bottom ends and said base includes a guide member of C-cross section, said constriction engaging said guide member of C-section on the base.

3. A stand as claimed in claim 2, wherein said gripping arms have inwardly bent top and bottom ends, said top ends forming the trunk fixing portions and said bottom ends carrying said bearing means.

4. A stand as claimed in claim 2, wherein each tightening bolt is mounted outside and substantially parallel to the longer portion of the associated gripping arm and the shorter portion of the arm guides and limits the tilt of said arm.

* * * * *